United States Patent
Hall et al.

(10) Patent No.: US 10,897,532 B2
(45) Date of Patent: Jan. 19, 2021

(54) MOBILE RADIO DEVICE WITH OPERATIONAL LIGHTS FOR COUPLING TO A MOBILE TELECOMMUNICATION DEVICE

(71) Applicant: Hall Labs LLC, Provo, UT (US)

(72) Inventors: David R. Hall, Provo, UT (US); Dustin Clouse, Springville, UT (US); Davido Hyer, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/172,172

(22) Filed: Oct. 26, 2018

(65) Prior Publication Data

US 2020/0137210 A1    Apr. 30, 2020

(51) Int. Cl.
| | |
|---|---|
| *H04W 4/90* | (2018.01) |
| *H04W 64/00* | (2009.01) |
| *H04W 4/02* | (2018.01) |
| *H04W 76/50* | (2018.01) |
| *H04M 1/247* | (2006.01) |
| *H04M 1/725* | (2006.01) |
| *G01S 5/02* | (2010.01) |

(52) U.S. Cl.
CPC ......... *H04M 1/7258* (2013.01); *G01S 5/0231* (2013.01); *H04M 1/2471* (2013.01); *H04M 1/72536* (2013.01); *H04M 1/72563* (2013.01); *H04M 1/72597* (2013.01); *H04M 2201/42* (2013.01); *H04M 2242/04* (2013.01)

(58) Field of Classification Search
CPC ......... H04W 4/90; H04W 64/00; H04W 4/02; H04W 4/029; H04W 4/30; H04W 76/50; G08B 25/016; G08B 25/10; G08B 21/0202; G08B 25/004; G08B 21/0446; G01S 5/0027; G01S 5/0009; G01S 11/02; G01S 13/767; G01S 1/047; G01S 5/0231; H04M 1/72538; H04M 1/72536; H04M 1/72572
USPC ... 455/404.2, 404.1, 456.6, 100, 456.1, 557, 455/566, 90.1; 340/573.1, 573.4, 539.1, 340/8.1, 539.13, 539.11
See application file for complete search history.

(56) References Cited

U.S. PATENT DOCUMENTS

| | | | | |
|---|---|---|---|---|
| 2014/0266731 | A1* | 9/2014 | Malhotra | G06F 1/163 340/573.1 |
| 2016/0174025 | A1* | 6/2016 | Chaudhri | H04B 1/385 455/41.1 |
| 2018/0357887 | A1* | 12/2018 | Geyer | G08B 21/0297 |

* cited by examiner

*Primary Examiner* — Philip Sobutka

(57) ABSTRACT

In a first aspect, the invention is an apparatus for a mobile communication network, which includes a mobile telecommunications device, with a graphical user interface and a memory. The apparatus also includes a mobile radio device, communicatively coupled to the mobile telecommunications device, thereby creating a pair of communicatively coupled mobile devices. The mobile radio device includes a plurality of lights functioning as a secondary user interface and, in conjunction with the graphical user interface provides a unified user interface. The mobile radio device also includes a memory, a GPS chip and an accelerometer, a magnetometer, and a gyroscope. The plurality of lights communicate an operational mode and status to a user. The operational mode is at least one of: a battery level indicator mode, a signal strength indicator mode, a compass indicator mode, a tracking mode, a path saving mode, a waypoint mode, and a disaster mode.

20 Claims, 12 Drawing Sheets

MOBILE RADIO DEVICE WITH OPERATIONAL LIGHTS FOR COUPLING TO A MOBILE TELECOMMUNICATION DEVICE

TECHNICAL FIELD

This invention relates generally to the field of communication and more specifically relates to communication using radio signals for enabling ad hoc wireless communication in various locations, including remote locations.

BACKGROUND

Wireless communication has an increasingly ubiquitous presence in the world today. Although wireless communication networks such as cellular towers, wi-fi networks, Bluetooth, satellite constellations, and other wireless signal transmission methods are readily available in many locations, there are still a significant number of locations in the world where radio frequency communication still provides an effective and efficient alternative.

For example, while most people have a cellular telephone, there are many "dead zones" or areas where cellular communication signals are simply not available due to the lack of cellular infrastructure. When hiking, hunting, camping or engaging in other activities, it is not uncommon for a person to find themselves out of range for any cellular towers or cellular network infrastructure. This type of situation renders a typical cellular telephone useless for most communication purposes until the cellular telephone is once again in a location where a cellular signal is available.

In response to this problem, a number of communication protocols for wireless communication using radio signals in conjunction with a cellular phone have been introduced. Mesh networks and other "off-the-grid" solutions have been developed and enjoy some rate of adoption. Many of these devices provide supplemental antennas and connect to the cellular telephone via Bluetooth and are configured to communicate with similar devices over a short range, providing some rudimentary communication functionality.

One off-the-grid wireless solution that is currently gaining traction in the marketplace is the localized communication functionality provided by wireless communication between multiple smart phones now offered by a number of companies. Using a proprietary smartphone software application or "app," coupled with an antenna, users can use their smartphones to communicate with each other in a highly localized area where other types of wireless signals may not be available. While increasingly popular, these devices are still relatively new and the functionality for most of these devices is quite limited. Accordingly, without continued improvement to the devices and methods used for off-the-grid wireless communications, the solutions will continue to be sub-optimal.

SUMMARY OF THE INVENTION

In a first aspect, the invention is an apparatus for a mobile communication network, which includes a mobile telecommunications device, with a graphical user interface and a memory. The apparatus also includes a mobile radio device, communicatively coupled to the mobile telecommunications device, thereby creating a pair of communicatively coupled mobile devices. The mobile radio device includes a plurality of lights functioning as a secondary user interface and, in conjunction with the graphical user interface provides a unified user interface. The mobile radio device also includes a memory, a gyroscope, a magnetometer, a GPS chip and an accelerometer. The plurality of lights communicate an operational mode and status to a user. The operational mode is at least one of: a battery life indicator mode, a signal strength indicator mode, a compass indicator mode, a tracking mode, a path saving mode. a waypoint mode, and a disaster mode.

In a second aspect, the invention is a method of wireless communication using the components described above.

The pair of communicatively coupled mobile devices is preferably used to provide wireless communication for off-the-grid communication environments. The most preferred embodiments of the present invention employ a 900 mhz radio device communicatively coupled with a mobile telecommunication device such as a smart phone or tablet to relay information and messages from one pair of devices to another pair of devices and to provide a wide variety of useful features and functions. Each of the communicatively coupled communication devices comprise a unique user interface for each of the communicatively coupled mobile devices. Taken together, each of the unique user interfaces combine to create a unified user interface that provides information and feedback to the operator of the mobile devices. Signal range varies from 1 to 5 miles through and around obstructions to more than 50 miles line-of-sight.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1:
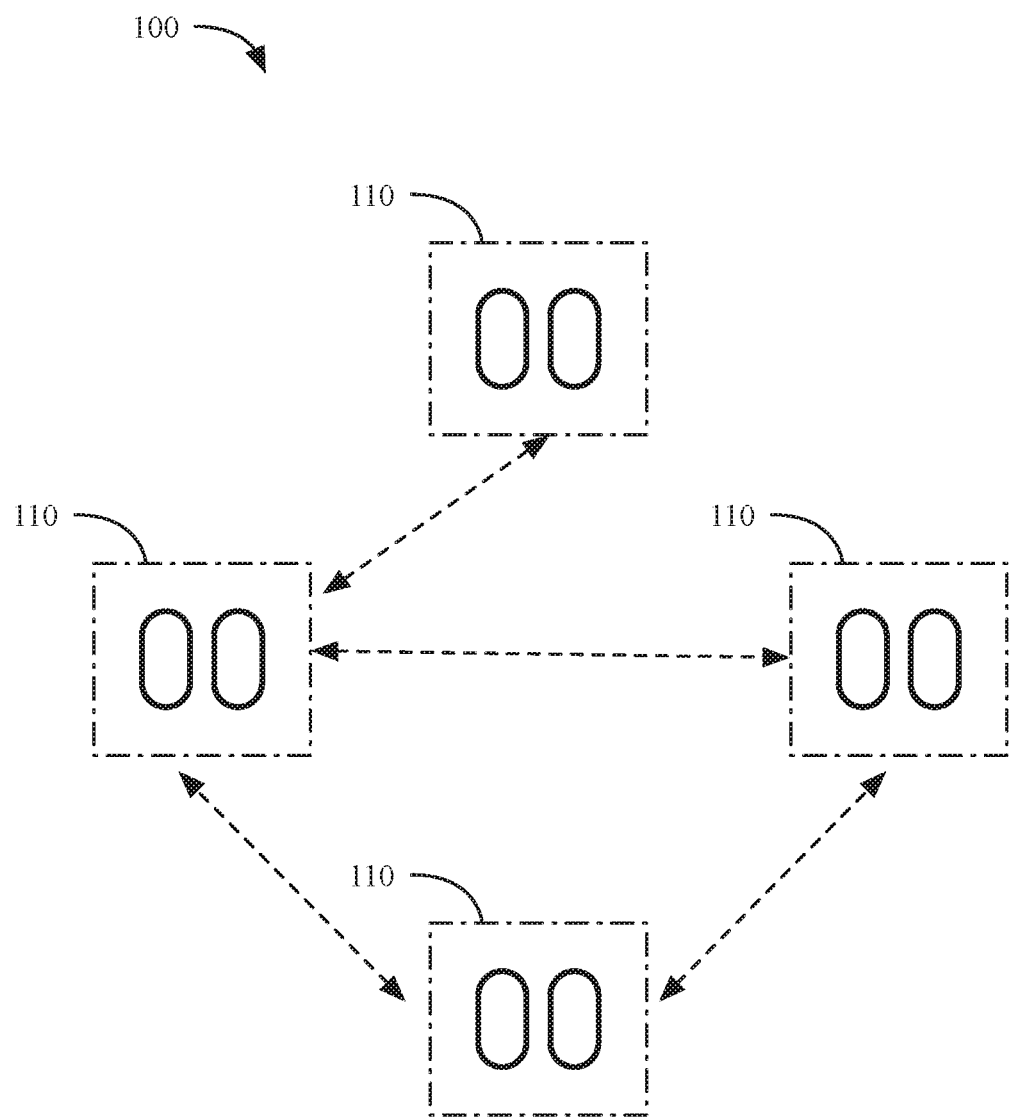
FIG. 1 depicts wireless communication in accordance with a preferred exemplary embodiment of the present invention.

A detailed description of the various preferred embodiments of the present invention is provided below by example, with reference to various figures. Those skilled in the art will recognize that the components of the invention as described by example in the figures below could be arranged and designed in a wide variety of different configurations. Thus, the detailed description of the various preferred embodiments in the figures is merely representative of certain preferred embodiments of the present invention, and the detailed description is not intended to limit the scope of the invention as claimed.

The descriptions of the various preferred embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

Throughout the detailed description, various elements are described as "off-the-shelf." As used herein, "off-the-shelf" means "pre-manufactured" and/or "pre-assembled."

In some instances, features represented by numerical values, such as dimensions, quantities, and other properties that can be represented numerically, are stated as approximations. Unless otherwise stated, an approximate value means "correct to within 50% of the stated value." Thus, a length of approximately 1 inch should be read "1 inch+/−0.5 inch." Similarly, other values not presented as approximations have tolerances around the stated values understood by those skilled in the art. For example, a range of 1-10 should be read "1 to 10 with standard tolerances below 1 and above 10 known and/or understood in the art."

In the most preferred embodiments of the present invention, a pair of communicatively coupled mobile devices is used to provide wireless communication for off-the-grid communication environments. The most preferred embodiments of the present invention employ a 900 mhz radio device communicatively coupled with a mobile device such as a smart phone or tablet to relay information and messages from one pair of devices to another pair of devices and to provide a wide variety of useful information. Each of the communicatively coupled communication devices comprise a unique user interface for each of the communicatively coupled mobile devices. Taken together, each of the unique user interfaces combine to create a unified user interface that provides information and feedback to the operator of the mobile devices. Signal range varies from 1 to 5 miles through and around obstructions to more than 50 miles line-of-sight.

Referring now to FIG. 1, a communications network 100 comprises a plurality of pairs of communicatively coupled mobile devices 110 in accordance with a preferred exemplary embodiment of the present invention is depicted. In the most preferred embodiments of the present invention, each pair of communicatively coupled mobile devices 110 comprises a telecommunications device (e.g. a device with the capability of communicating via a cellular network such as a smart phone or tablet) and a radio device where the phone device and the radio device are communicatively coupled via a technology such as Bluetooth pairing or some similar technology. As shown in FIG. 1, communications network 100 provides for bi-directional communication between multiple communicatively coupled pairs of mobile devices 110. A first pair of communicatively coupled mobile devices 110 may be in communication with one or more additional pairs of communicatively coupled mobile devices 110 that are in range (e.g., one-to-one connection or one-to-many connection).

The user of each pair of communicatively coupled mobile devices 110 can selectively connect with any other desired pair of communicatively coupled mobile devices 110 that is in range of his or her communicatively coupled mobile devices 110. The most preferred embodiments of the present invention are configured to pass information and communications from one pair of communicatively coupled mobile devices 110 to another pair of communicatively coupled mobile devices 110 in a direct connection fashion or in a "daisy chain" fashion where one pair of communicatively coupled mobile devices 110 acts as a link or bridge between two or more additional pairs of communicatively coupled mobile devices 110. With 3, 4, 5, or even more connected pairs of communicatively coupled mobile devices 110 distributed over a distance, network 100 can be expanded over a very large geographic area that is much larger than would be possible with only two pairs of communicatively coupled mobile devices 110.

Figure 2:
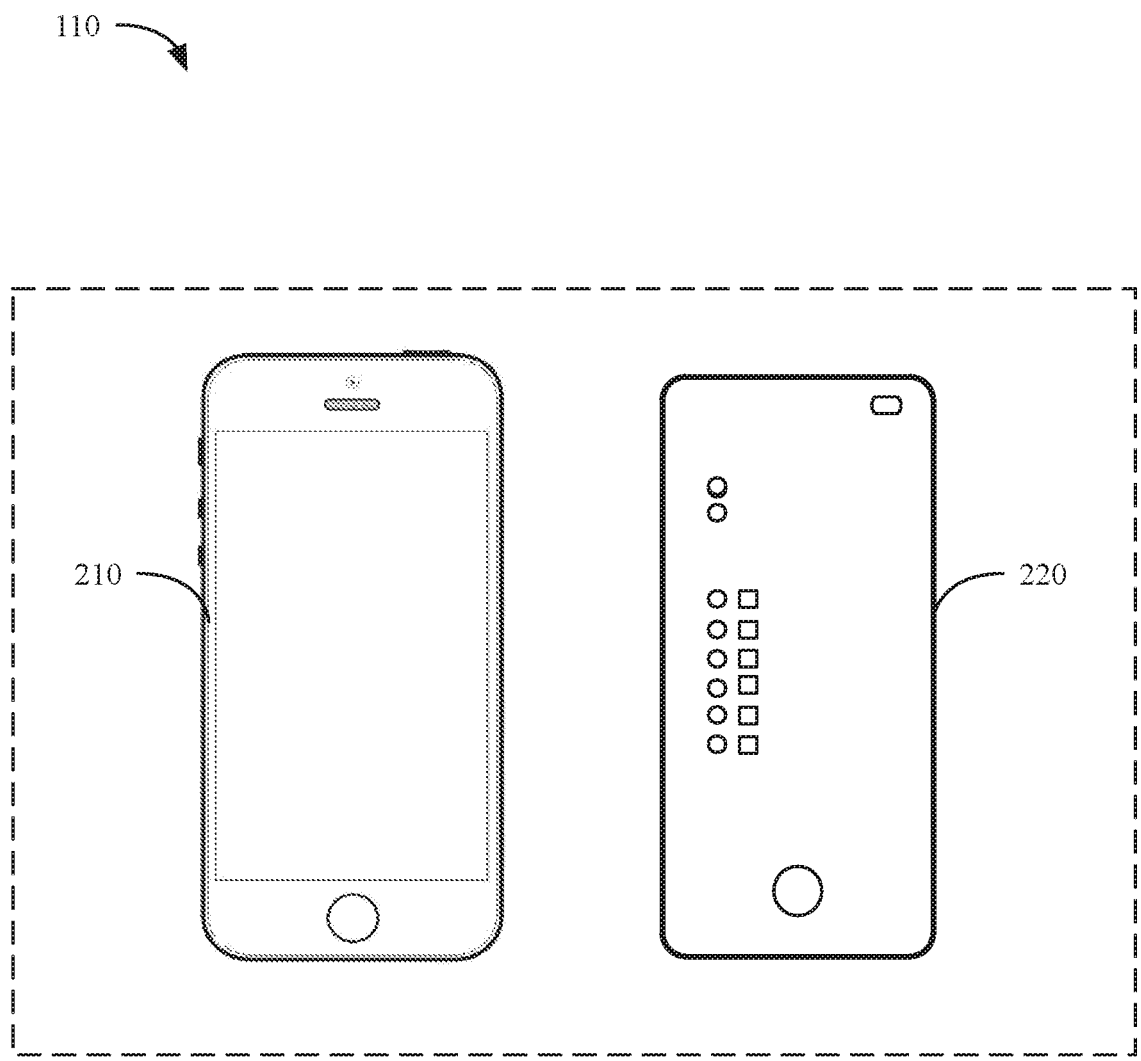
FIG. 2 depicts a telecommunications device and a radio device configured for wireless communication in accordance with a preferred exemplary embodiment of the present invention.

Referring now to FIG. 2, a pair of communicatively coupled mobile devices 110 in accordance with a preferred exemplary embodiment of the present invention is depicted. As shown in FIG. 2, a pair of communicatively coupled mobile devices 110 most preferably comprises a telecommunications device 210 and a radio device 220. Telecommunications device 210 is most preferably any mobile device that is capable of sending and receiving standard cellular signals such as a smart phone or tablet. Radio device 220 is a radio transceiver operating in a pre-determined bandwidth and each radio device 220 will be identified by a unique identifier so that each communication from one pair of communicatively coupled mobile devices 110 can be routed to the correct destination and back again. This also allows each user to identify which pair of communicatively coupled mobile devices 110 they wish to send messages to and receive messages from. In the most preferred embodiments of the present invention, all information passed between telecommunications device 210 and radio device 220 is encrypted using any suitable encryption methodology known to those skilled in the art (e.g., AES128).

The most preferred embodiments of radio device 220 may be any suitable device suitable for the applications set forth herein. For example, the Sure-Fi® Wiegand Wireless Bridge could be readily adapted to provide the functions of radio device 220 for various preferred embodiments of the present invention. See the info on the sure-fi.com site. Additional radio functionality, such as the subject matter set forth in US Patent Publication No. 2018/0007691, US Patent Publication No. 2018/0183143, and US Patent Publication No. 2018/0269580, all of which are incorporated herein by reference.

Figure 3:
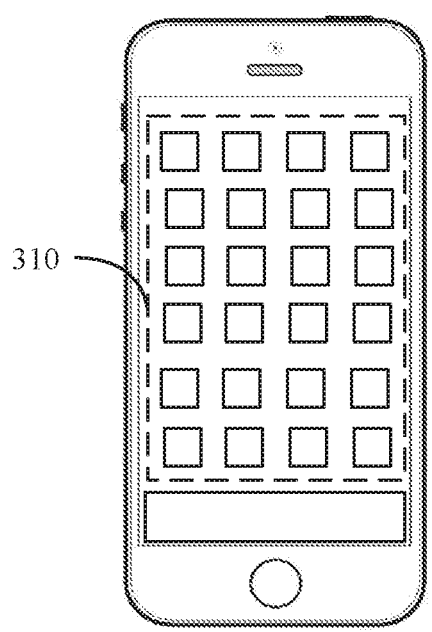
FIG. 3 depicts a telecommunications device configured for wireless communication in accordance with a preferred exemplary embodiment of the present invention.

Referring now to FIG. 3, a telecommunications device 210 in accordance with a preferred exemplary embodiment of the present invention is depicted. Telecommunications device 210 is any suitable mobile communication device capable of being communicatively coupled to radio device 220. This includes mobile phones, smart phones, tablets and the like, regardless of operating system or manufacturer. In the most preferred embodiments of the present invention, telecommunications device 210 has a plurality of software applications or "apps" that allow telecommunications device 210 to perform various functions. Each app is generally represented by an icon 310 that allows the user launch the app by pressing the relevant icon.

Figure 4:
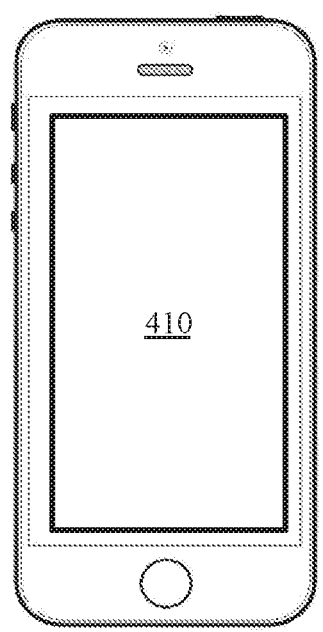
FIG. 4 depicts a telecommunications device configured for wireless communication in accordance with a preferred exemplary embodiment of the present invention.

Referring now to FIG. 4, telecommunications device 210 will most preferably display a user interface 410 for interacting with, communicating with, and controlling radio device 220. User interface 410 is most preferably a graphical user interface that may be activated by pressing on one of the icons 310, with that icon represents the app for user interface 410 as explained in conjunction with FIG. 3. User interface 410 will typically include the ability to prepare and send messages to and from the radio device 220 that is paired with telecommunications device 210 to other similar devices radio device 220 as well as other functions which are explained below in conjunction with the other figures. User interface 410 provided by telecommunications device 210 will work in tandem with a second user interface presented by radio device 220 to provide a unified user interface that allows a user to access and control the functions and features of telecommunications device 210 and radio device 220.

Figure 5:
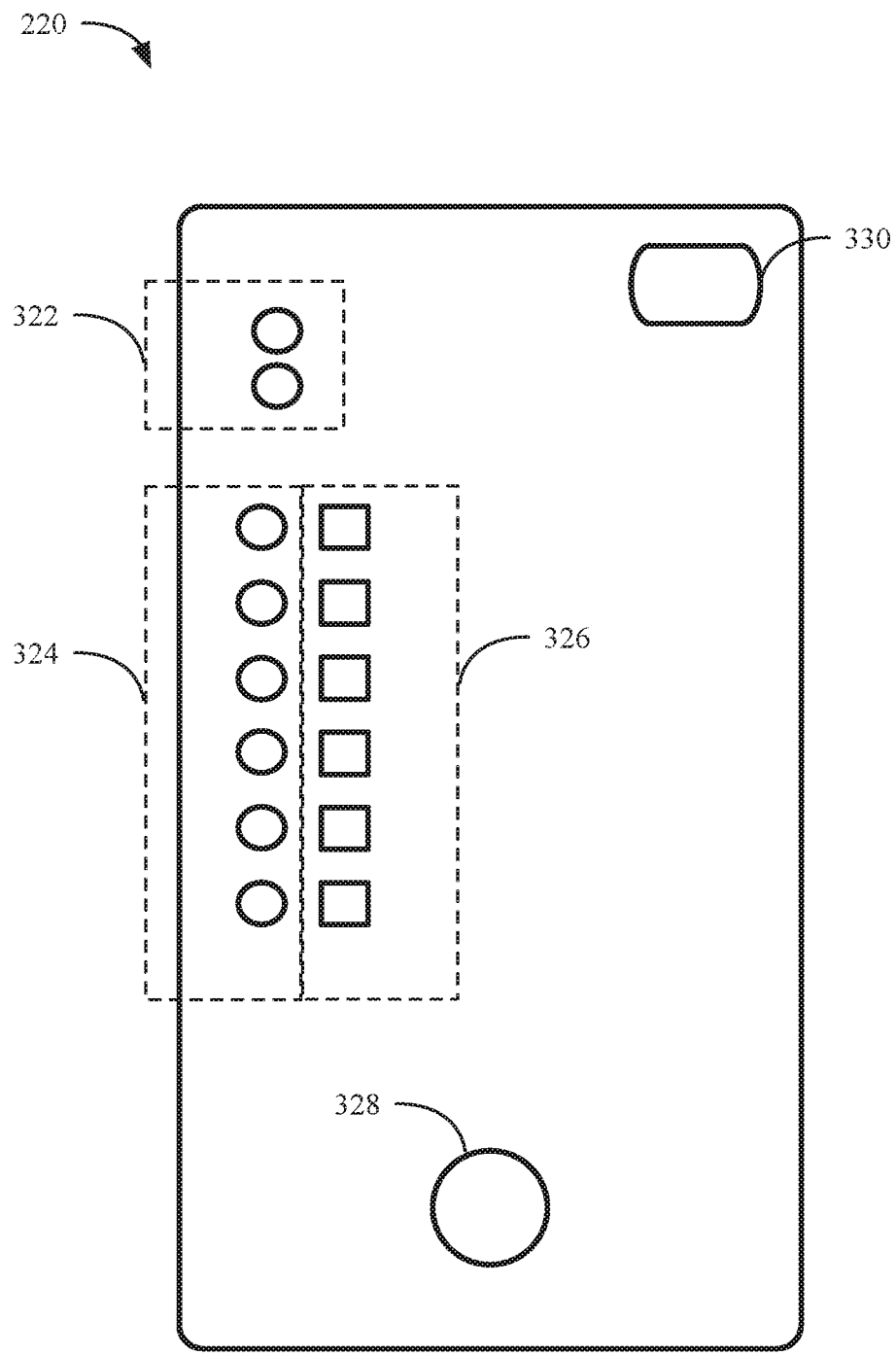
FIG. 5 depicts a radio device configured for wireless communication in accordance with a preferred exemplary embodiment of the present invention.

Referring now to FIG. 5, a radio device 220 in accordance with a preferred exemplary embodiment of the present invention is depicted. In the most preferred embodiments of the present invention, radio device 220 will comprise a number of components that are configured to convey information to the user of communicatively coupled mobile devices 110. For example, a plurality of mode indicator and signal lights 324, at least one TX/RX indicator light 322, a GPS chip, a memory chip with a plurality of memory locations, a speaker, haptic feedback chip, an accelerometer, a magnetometer, a gyroscope, and a processor or CPU that is used to control the functions of radio device 220. In addition, a mode select or power button 328 may be included as well as one or more icons 326 that are used to identify the various modes and operational functions of radio device 220. An aperture 330 may be included for using a carabiner or other device to attach radio device 220 to a backpack or other item.

TX/RX indicator lights 322 are illuminated whenever radio device 220 is sending or receiving transmissions from another similar radio device 220. Mode indicator lights 324 and TX/RX indicator light(s) 322 act as a secondary user interface and, when combined with user interface 410, will work in tandem to provide a unified user interface that allows a user to access and control the functions and features of telecommunications device 210 and radio device 220.

Mode select 328 may be used to power up radio device 220 and also to switch radio device 220 from one operational mode to another. When desired, the user will simply press and hold button 328 to turn the power on for radio device 220. Then, when it's time to power radio device 220 down, the user will press and hold button 328 to turn the power off. Once radio device 220 has been powered on, pressing button 328 twice in rapid succession will switch radio device 220 from one operational mode to another in a cyclical fashion, allowing the user to select the operational mode that is relevant for the current situation or application. In addition to mode select 328, the user may select the desired operational mode of radio device 220 by accessing user interface 410 on telecommunications device 210. The specific mode of operation for radio device 220 can be selected by a user based on situational factors, circumstances, conditions, and the desired application.

In at least one preferred embodiment of the present invention, radio device 220 will comprise a battery configuration that permits recharging of telecommunications device 210 when necessary or desired. For example, a USB port may be provided on a surface of radio device 220 that will accept a cable to connect radio device 220 and telecommunications device 210, thereby transferring electrical energy from the battery inside radio device 220 to the battery used to power telecommunications device 210.

Figure 6:
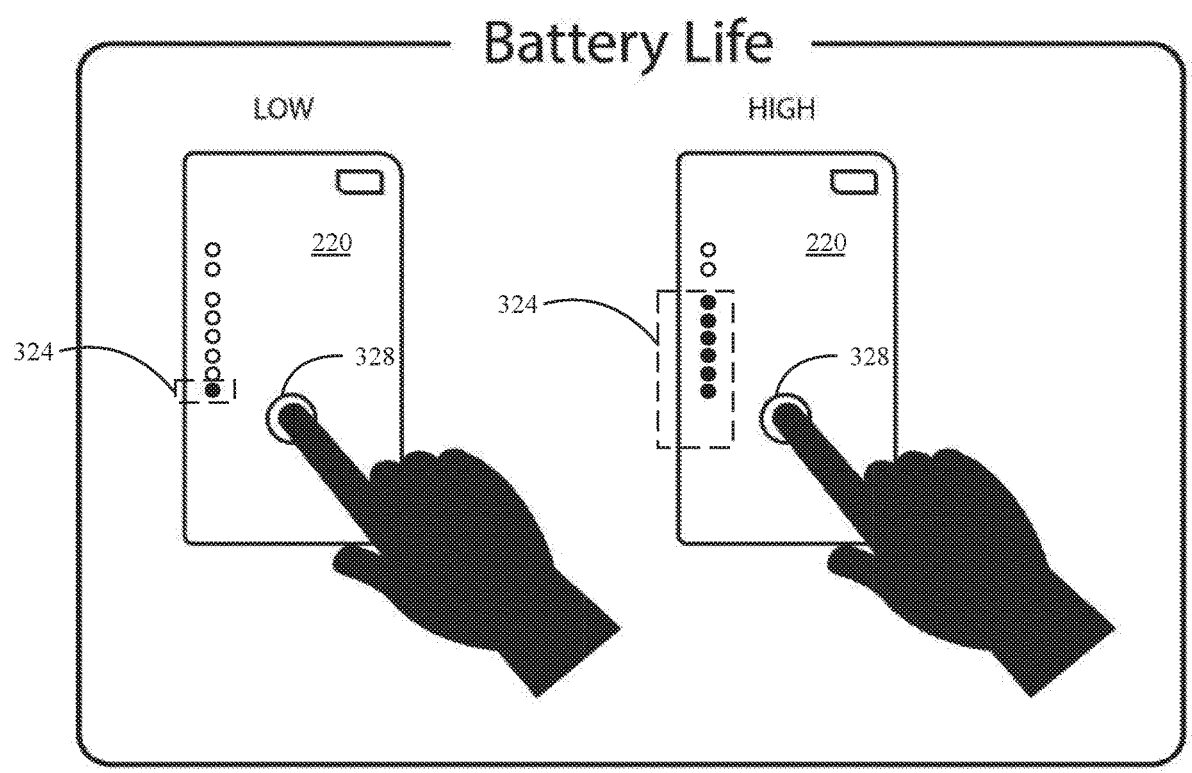
FIG. 6 depicts a battery life indicator mode of operation for a radio device configured for wireless communication in accordance with a preferred exemplary embodiment of the present invention.

Referring now to FIG. 6 a battery life indicator mode of operation for a radio device 220 configured for wireless communication in accordance with a preferred exemplary embodiment of the present invention is depicted. As shown in FIG. 6, with radio device 220 in battery life indicator mode, the user will press button 328 and, in response, a number of mode indicator lights 324 will be illuminated, indicating the level of battery power left in the batteries of radio device 220. For low battery power, a single mode indicator light 324 may be illuminated with a greater number of mode indicator lights 324 being illuminated in proportional amount relative to the remaining battery power remaining. For greater granularity, TX/RX indicator light(s) 322 may also be included in the visual display of battery power.

Figure 7:
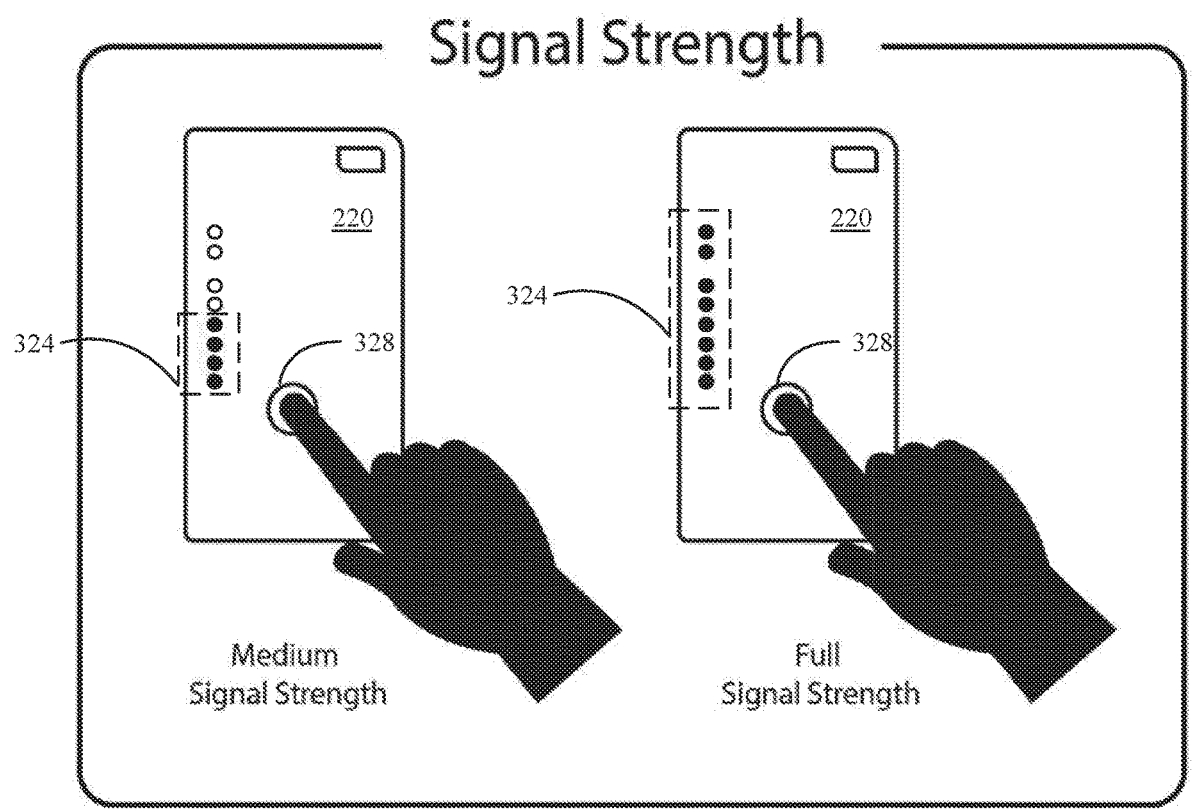
FIG. 7 depicts a signal strength indicator mode of operation for a radio device configured for wireless communication in accordance with a preferred exemplary embodiment of the present invention.

Referring now to FIG. 7 depicts a signal strength indicator mode of operation for a radio device 220 configured for wireless communication in accordance with a preferred exemplary embodiment of the present invention is depicted. As explained in conjunction with FIG. 6, mode indicator lights 324 and TX/RX indicator light(s) 322 act as a secondary user interface. When radio device 220 is in signal strength indicator mode, mode indicator lights 324 and TX/RX indicator light(s) 322 are illuminated in proportion to the strength of the signal sensed by radio device 220 with more lights being illuminated to indicate a stronger signal and fewer lights being illuminated to indicate a weaker signal.

Figure 8:
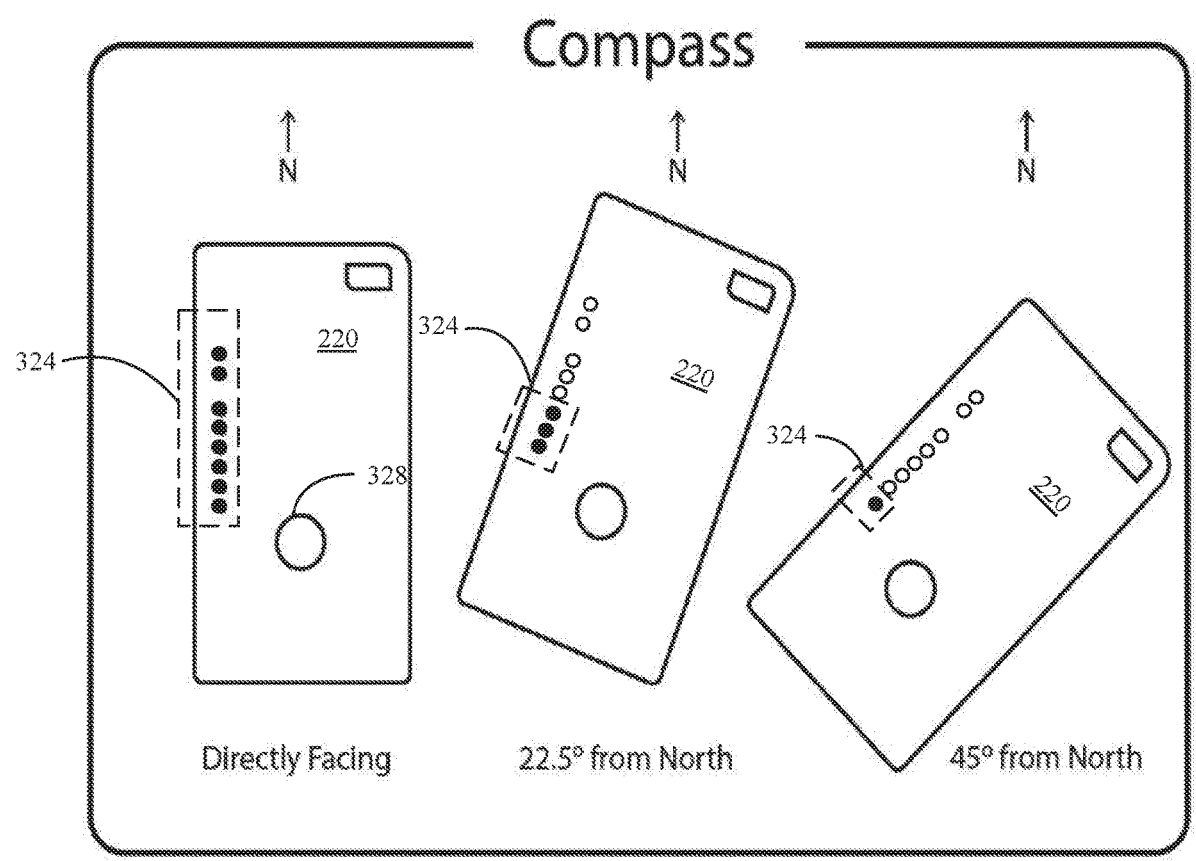
FIG. 8 depicts a compass indicator mode of operation for a radio device configured for wireless communication in accordance with a preferred exemplary embodiment of the present invention.

Referring now to FIG. 8, a compass indicator mode of operation for a radio device 220 configured for wireless communication in accordance with a preferred exemplary embodiment of the present invention is depicted. As with the previous battery life and signal strength indicator modes, mode indicator lights 324 and TX/RX indicator light(s) 322 of radio device 220 function as a user interface to provide information relative to compass direction. When in compass indicator mode, the number of mode indicator lights 324 and TX/RX indicator light(s) 322 illuminated will correspond to the north/south/east/west relative position of radio device 220. The more closely the axis of radio device 220 is aligned with north, the greater the number of mode indicator lights 324 and TX/RX indicator light(s) 322 will be illuminated.

Those skilled in the art will recognize that the specific implementation of the compass indicator mode may take many forms. For example, if radio device 220 is pointing due south, all or substantially all indicator lights 324 and/or 322 will be off. If facing north, all indicator lights 324 and/or 322 would be illuminated. This approach may provide lower resolution, but would allow the user to head in any direction as opposed to only north. West and east would look identical, and would require the user to understand where west is in relation to north and south, and half of indicator lights 324 and/or 322 would be illuminated to indicate east and west.

Figure 9:
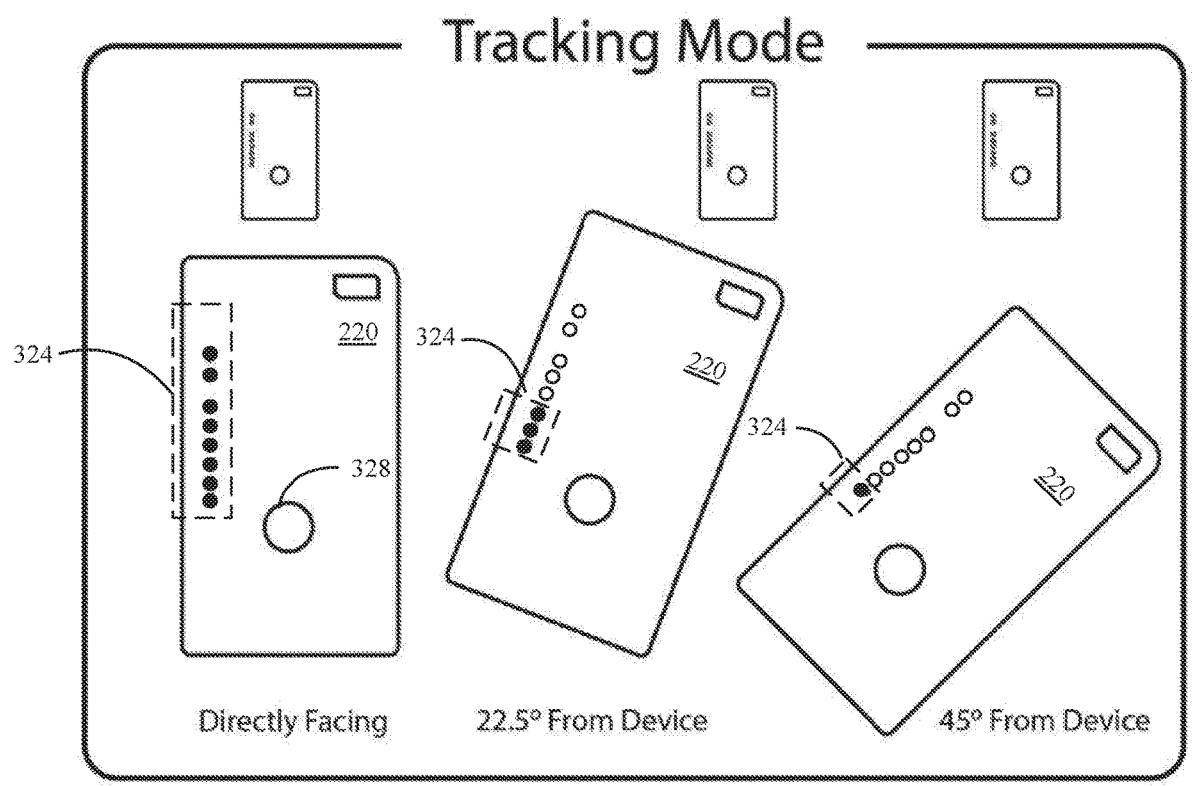
FIG. 9 depicts a tracking mode of operation for a radio device configured for wireless communication in accordance with a preferred exemplary embodiment of the present invention.

Referring now to FIG. 9, a tracking mode of operation for a radio device 220 configured for wireless communication in accordance with a preferred exemplary embodiment of the present invention is depicted. As with compass indicator mode, mode indicator lights 324 and TX/RX indicator light(s) 322 are illuminated to provide the user with specific information. In this case, instead of being triggered by positioning relative to compass direction, mode indicator lights 324 and TX/RX indicator light(s) 322 are illuminated relative to the direction of a second radio device 220. This allows a first user to accurately locate the direction for a second user, allowing the first user to move in the appropriate direction so as to locate the second user.

Figure 10:
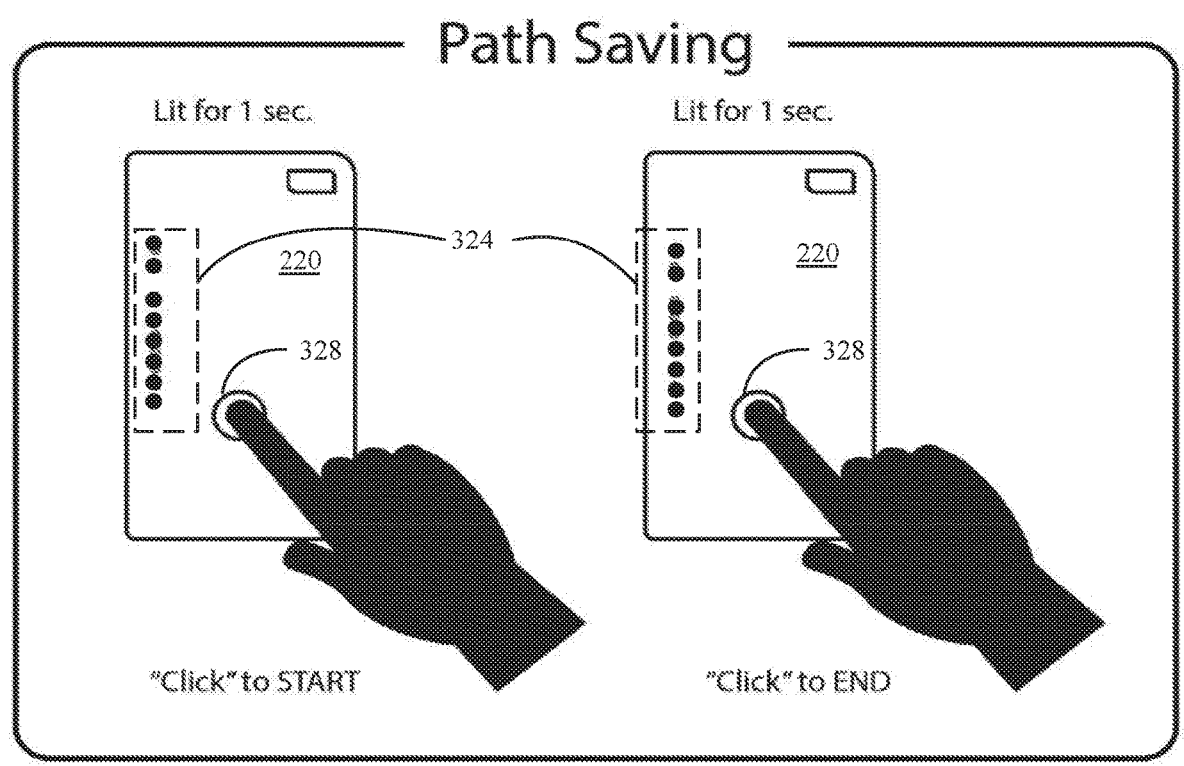
FIG. 10 depicts a path saving mode of operation for a radio device configured for wireless communication in accordance with a preferred exemplary embodiment of the present invention.

Referring now to FIG. 10 depicts a path saving mode of operation for a radio device 220 configured for wireless communication in accordance with a preferred exemplary embodiment of the present invention is depicted. Once radio device 220 is in path saving mode, the user will mark the starting point of the path by pressing button 328 and then move from a first location to another location. The end of the path will be captured when the user presses button 328 the second time and radio device 220 will store the movements and path between the first click and the second click for later playback. The user could then retrace the steps or transmit the directional movements to a second user via radio device 220. Multiple paths may be saved and then recalled by accessing the various paths via user interface 410.

Figure 11:
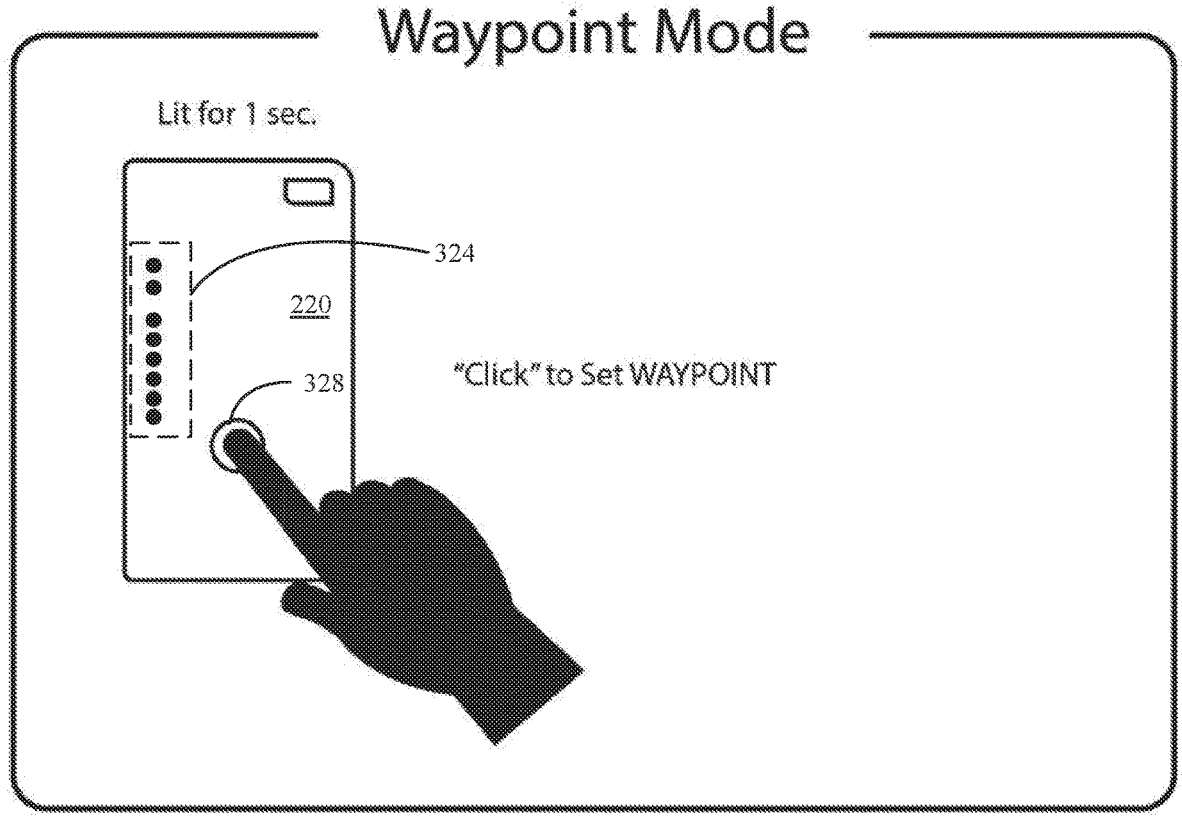
FIG. 11 depicts a waypoint mode of operation for a radio device configured for wireless communication in accordance with a preferred exemplary embodiment of the present invention.

Referring now to FIG. 11, a waypoint mode of operation for a radio device 220 configured for wireless communication in accordance with a preferred exemplary embodiment of the present invention is depicted. Once in waypoint mode, the user will simply click on button 328 to enter the current location coordinates (e.g., latitude and longitude as well as altitude) into a memory location of radio device 220. This allows the user to recall the location at a later day and time and then navigate to that same point. Multiple waypoints may be saved and then recalled by accessing the waypoint locations via user interface 410.

Figure 12:
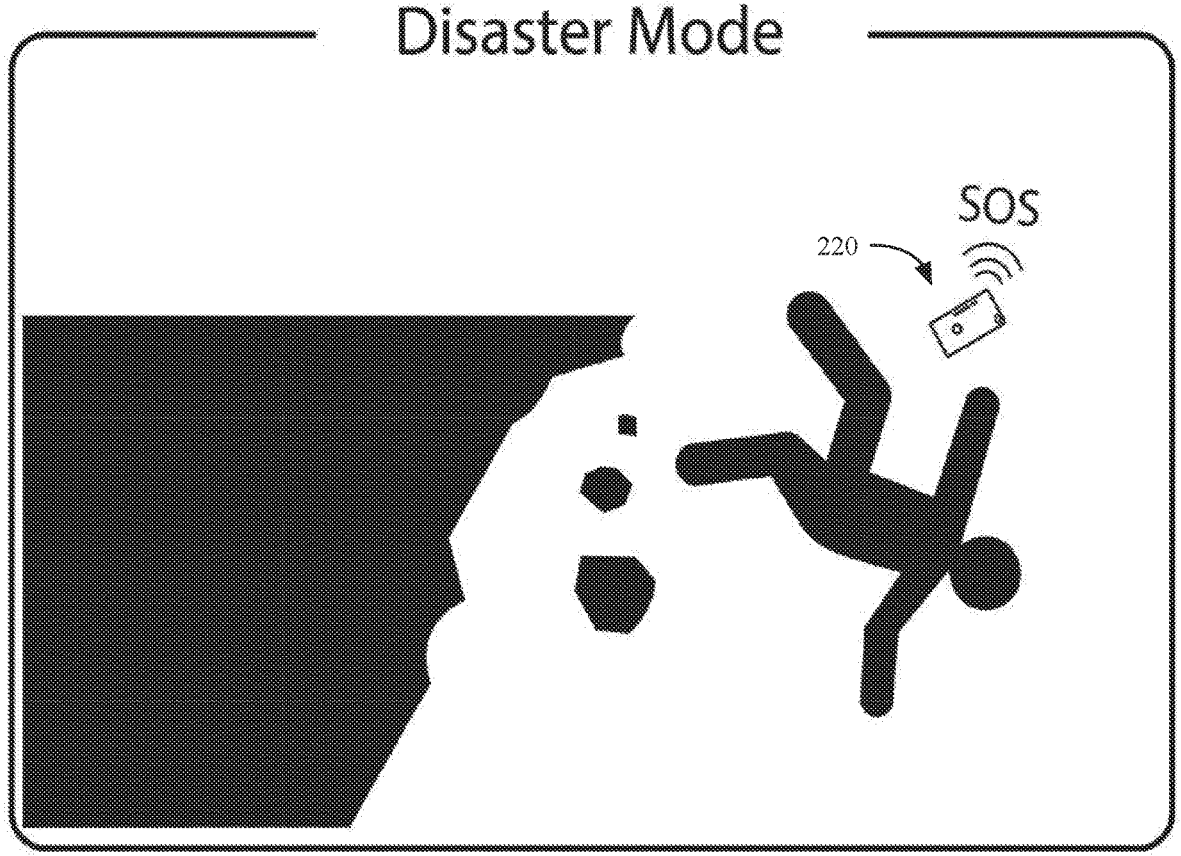
FIG. 12 depicts a disaster mode of operation for a radio device configured for wireless communication in accordance with a preferred exemplary embodiment of the present invention.

Referring now to FIG. 12, the use of a "disaster mode" in accordance with a preferred exemplary embodiment of the present invention is depicted. In disaster mode, radio device 220 automatically sets itself to function as a locator beacon and starts transmitting its location and an optional SOS type message if it senses an action that may indicate distress, such as prolonged free-fall, encountering excessive gravitational forces ("G-forces"), or prolonged rotational movement or tumbling as measured by a predetermined threshold. This is a passive mode that can run concurrently with other modes in the background and will be activated automatically or as determined by the user. The beacon will allow the device to be located by responders and, if in close proximity, the user may also be located. Once disaster mode has been activated, the user can deactivate disaster mode via user interface 410.

Figure 13:
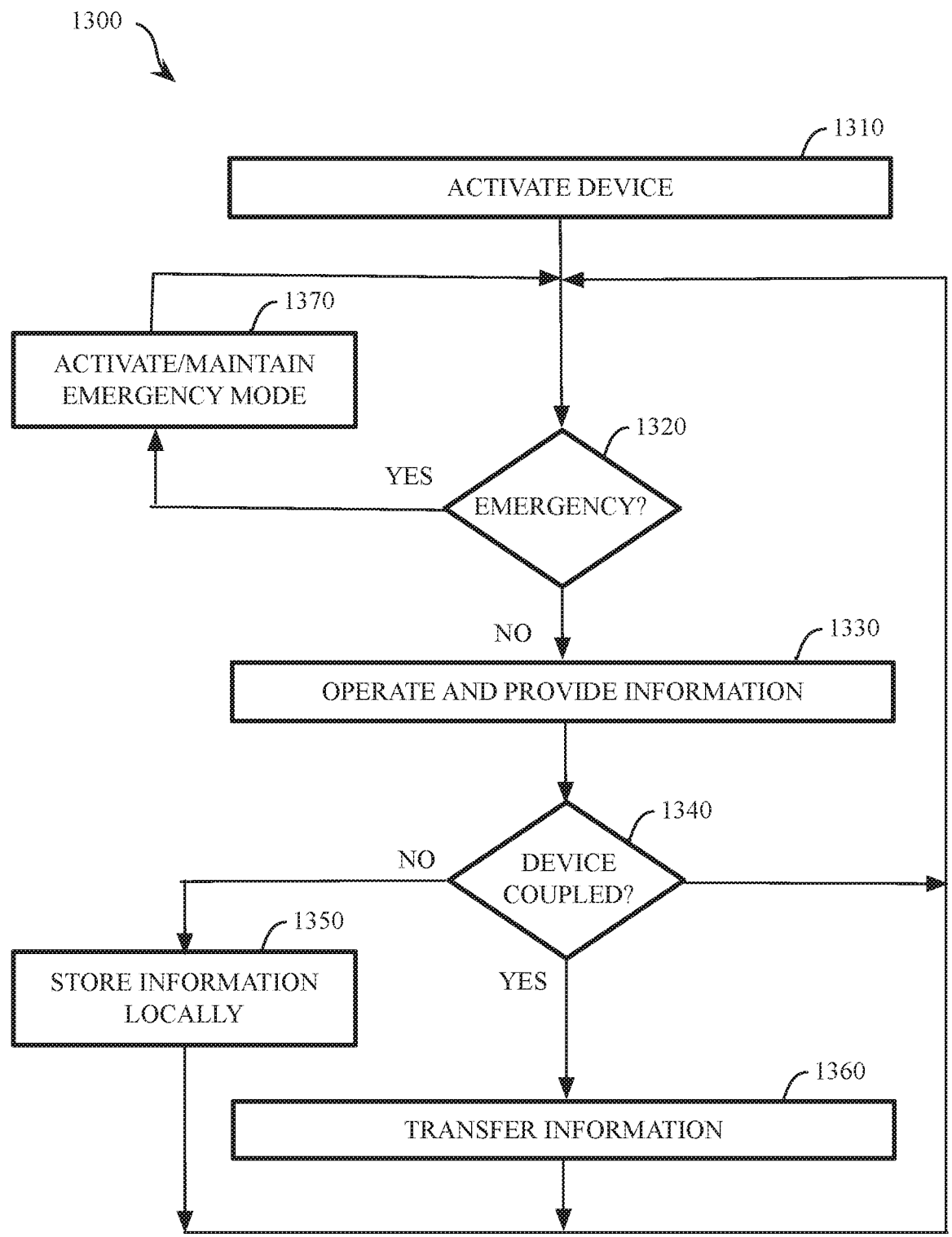
FIG. 13 depicts a method of wireless communication using wireless communication devices in accordance with a preferred exemplary embodiment of the present invention.

Referring now to FIG. 13, a method 1300 of wireless communication using one or more wireless communication devices in accordance with a preferred exemplary embodiment of the present invention is depicted. As shown in FIG. 13, a pair of wireless communication devices is activated (step 1310) and the existence of an emergency situation is evaluated (step 1320). An emergency situation may be any unusual situation detected by the wireless communication devices. If there is no emergency situation (step 1320="NO"), the wireless communication device(s) will operate in normal mode and, depending on the selected functional mode, provide and store information (step 1330). If the wireless communication devices are communicatively coupled (step 1340="YES") then the information stored will be transferred from one device to the other so as to keep the relevant information synchronized between devices (step 1360). However, if the devices are not communicatively coupled, then the information will be stored locally for later synchronization (step 1350).

However, if an emergency situation is detected (STEP 1320="YES"), the device will enter emergency mode (STEP 1370) and function as an emergency beacon, sending one or more di stress signals.

In addition to the various operational modes described above, the user may also access a text message function in user interface 410 and compose and then transmit a text message to another person who is in range of radio device 220 or the extended range as provided by a number of similarly equipped communicatively coupled devices. If the devices are not in range, the text message will be stored and then transmitted at a later time when the devices are in range.

In addition, while the disclosure discusses the communicative coupling of telecommunications device 210 and radio device 220, this communicative coupling is not required to be present at all times. For example, radio device 220 may be operated in isolation mode, without being coupled to a telecommunications device 210. The various operational modes will still function as explained above with the information received and processed by radio device 220 (e.g., GPS coordinates, messages, waypoints, paths, etc.) being stored locally. Then, once radio device 220 is communicatively coupled to a compatible telecommunications device 210, the information stored by the memory chip or storage components in radio device 220 may be transferred to the memory of telecommunications device 210 and accessed via user interface 410.

Radio device 220 has an onboard GPS chip that allows radio device 220 to not be reliant on the GPS functionality of telecommunications device 210. This also makes it possible to track a user that only has a radio device 220 that is on but has no paired telecommunications device 210. Radio device 220 also comprises a speaker and haptic vibration feedback, that is useful for when the user does not have user interface 410 open because the radio device 220 can vibrate and mode indicator lights 324 and TX/RX indicator light(s) 322 can be illuminated when someone else is trying to make contact.

In at least one preferred embodiment of the present invention, all encryption is turned off and any other device in range of an emergency signal generated by radio device 220 will be able to receive messages from radio device 220 and transmit messages to it as well.

With the various modes described herein, the most preferred embodiments of the present invention will provide for: the transmission of text messages from one pair of communicatively coupled mobile devices to another pair of communicatively coupled mobile devices via interface 410;

location sharing between pairs of communicatively coupled mobile devices so that location based services can be provided; onboard GPS signal capabilities; real time signal strength monitoring for each communicatively coupled mobile device; a rechargeable battery (e.g. 8000 mah lithium-ion rechargeable battery or similar); haptic and audio feedback for each communicatively coupled mobile device; and communication range of 50+ miles (line of sight) and 1-5 miles with obstructions.

From the foregoing description, it should be appreciated that the unique wireless communication system provided by the various preferred embodiments of the present invention offer significant benefits that would be apparent to one skilled in the art. Furthermore, while multiple preferred embodiments have been presented in the foregoing description, it should be appreciated that a vast number of variations in the preferred embodiments exist. Lastly, it should be appreciated that these embodiments are preferred exemplary embodiments only and are not intended to limit the scope, applicability, or configuration of the invention in any way. Rather, the foregoing detailed description provides those skilled in the art with a convenient road map for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. A device for wireless communication, the device comprising:
   a first wireless radio for communicating via a first radio access technology, wherein the first radio access technology is for communicating with a mobile telecommunications device;
   a second wireless radio for communicating via a second radio access technology, wherein the second radio access technology utilizes a 900-megahertz (MHz) frequency band for communicating with a second device; and
   a plurality of lights, the plurality of lights functioning as a user interface;
   a processor;
   a memory in electronic communication with the processor; and
   a housing, wherein the housing encloses the first wireless radio, the second wireless radio, the processor, and the memory;
   instructions stored in the memory, wherein the instructions are executable by the processor to:
     receive a message from the second device via the second wireless radio;
     transmit the message to the mobile telecommunications device via the first wireless radio;
     operate in an operational mode; and
     communicate at least one of the operational mode and information for the operational mode via the plurality of lights, the operational mode comprising at least one of:
       a battery life indicator mode;
       a signal strength indicator mode;
       a compass indicator mode;
       a tracking mode;
       a path saving mode;
       a waypoint mode; and
       a disaster mode.

2. The device of claim 1, wherein the plurality of lights comprise:
   at least a pair of transmit and receive indicator lights, the transmit and receive indicator lights indicating the sending and receiving of information via the second wireless radio.

3. The device of claim 1, wherein the plurality of lights comprise:
   a plurality of indicator lights, the plurality of indicator lights indicating at least one of the operational mode and the information for the operational mode, the information comprising at least one of:
     a compass heading with respect to the device;
     a geographic location of the second device with respect to the device;
     a battery power level of a battery of the device; and
     a signal strength of transmissions received by the second wireless radio.

4. The apparatus of claim 1, further comprising:
   an accelerometer.

5. The device of claim 4, wherein the instructions are further executable by the processor to:
   receive sensor data from the accelerometer;
   activate the disaster mode when the processor detects, based on the sensor data, at least one of:
     a free-fall of in excess of a predetermined threshold;
     gravitational forces in excess of a predetermined threshold; and
     rotational movement in excess of a predetermined threshold.

6. The device of claim 1, further comprising:
   a global positioning system (GPS) device.

7. The device of claim 6, wherein the instructions are further executable by the processor to:
   receive location information from the GPS device;
   store the location information in the memory when the device is not communicatively coupled to the mobile telecommunications device;
   connect to the mobile telecommunications device via the first wireless radio;
   sync any stored location information when the apparatus device is communicatively coupled to the mobile telecommunications device via the first wireless radio; and
   transmit the location information to the mobile telecommunications device via the first wireless radio when the device is communicatively coupled to the mobile telecommunications device.

8. The device of claim 1, wherein the instructions are further executable by the processor to:
   receive a text message from the mobile telecommunications device via the first wireless radio; and
   transmit the text message to the second device via the second wireless radio.

9. The device of claim 1, further comprising:
   a button, wherein the button is configured for selecting the operational mode; and
   a unique identifier for identifying the device during communication via the second wireless radio.

10. The device of claim 1, wherein the instructions are further executable by the processor to:
    receive a selection of the operational mode from the mobile telecommunications device via the first wireless radio.

11. A method of wireless communication, comprising:
communicating, by a first device, with a mobile telecommunications device via a first wireless radio, wherein the first wireless radio uses a first radio access technology;
communicating, by the first device, with a second device via a second wireless radio that utilizes a 900-megahertz (MHz) frequency band, wherein the second wireless radio uses a second radio access technology that is different than the first radio access technology; and
receiving, by the first device, a message from the second device via the second wireless radio;
transmitting, by the first device the message to the mobile telecommunications device via the first wireless radio;
operating, by the first device, in an operational mode, the operational mode comprising at least one of:
  a battery life indicator mode;
  a signal strength indicator mode;
  a compass indicator mode;
  a tracking mode;
  a path saving mode;
  a waypoint mode; and
  a disaster mode; and
indicating, by the first device, at least one of the operational mode and information for the operational mode via a plurality of lights.

12. The method of claim 11, further comprising:
indicating, by the first device sending and receiving of information via the second wireless radio using at least a pair of transmit and receive indicator lights.

13. The method of claim 11, wherein indicating the information for the operational mode comprises indicating at least one of:
  a compass heading with respect to the apparatus;
  a geographic location of the second device with respect to the apparatus;
  a battery power level of a battery of the apparatus; and
  a signal strength of transmissions received by the second wireless radio.

14. The method of claim 11, further comprising:
receiving, by the first device, sensor data from an accelerometer; and
detecting, by the first device, a disaster event based on the sensor data, wherein the disaster event comprises at least one of:
  a free-fall of in excess of a predetermined threshold;
  gravitational forces in excess of a predetermined threshold; and
  rotational movement in excess of a predetermined threshold; and
activating the disaster mode when the disaster event is detected.

15. The method of claim 11, further comprising:
receiving, by the first device, location information from a global positioning system (GPS) device.

16. The method of claim 15, further comprising:
storing, by the first device, the location information in the memory when the apparatus is not communicatively coupled to the mobile telecommunications device;
connecting, by the first device, to the mobile telecommunications device via the first wireless radio; and
syncing, by the first device, any stored location information when the apparatus is communicatively coupled to the mobile telecommunications device via the first wireless radio.

17. The method of claim 15, further comprising:
transmitting, by the first device, the location information to the mobile telecommunications device via the first wireless radio when the apparatus is communicatively coupled to the mobile telecommunications device.

18. The method of claim 11, further comprising:
receiving, by the first device, a text message from the mobile telecommunications device via the first wireless radio; and
transmitting, by the first device, the text message to the second device via the second wireless radio.

19. The method of claim 11, further comprising:
receiving, by the first device, a selection of the operational mode via a button.

20. The method of claim 11, further comprising:
receiving, by the first device, a selection of the operational mode from the mobile telecommunications device via the first wireless radio.

* * * * *